United States Patent
Ayala, II et al.

(10) Patent No.: US 8,134,318 B2
(45) Date of Patent: Mar. 13, 2012

(54) SYSTEM AND METHOD OF CURRENT SHAPING CONTROL FOR RETRACT

(75) Inventors: Julio Enrique Ayala, II, Wylie, TX (US); Juergen Luebbe, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 452 days.

(21) Appl. No.: 12/395,106

(22) Filed: Feb. 27, 2009

(65) Prior Publication Data

US 2010/0061022 A1 Mar. 11, 2010

Related U.S. Application Data

(60) Provisional application No. 61/095,396, filed on Sep. 9, 2008.

(51) Int. Cl.
*H02P 6/16* (2006.01)
(52) U.S. Cl. .................. 318/400.4; 360/75; 360/264.7; 360/266.4; 360/294.5
(58) Field of Classification Search ............. 318/400.04; 360/75, 264.7, 266.4, 294.5
See application file for complete search history.

(56) References Cited

U.S. PATENT DOCUMENTS

| 6,040,671 | A | 3/2000 | Brito et al. |
| 6,282,049 | B1* | 8/2001 | Cameron et al. ............. 360/75 |
| 6,721,119 | B1 | 4/2004 | Hassan et al. |
| 6,760,179 | B2 | 7/2004 | Moon et al. |
| 6,859,340 | B2 | 2/2005 | Brittner et al. |
| 7,042,672 | B2* | 5/2006 | Brenden et al. ............. 360/75 |
| 7,054,091 | B2 | 5/2006 | Swize |
| 2004/0100718 | A1* | 5/2004 | Swize et al. ............. 360/75 |

* cited by examiner

*Primary Examiner* — Walter Benson
*Assistant Examiner* — Erick Glass
(74) *Attorney, Agent, or Firm* — John J. Patti; Wade J. Brady, III; Frederick J. Telecky, Jr.

(57) ABSTRACT

A system for implementing current shaping for retract of a voice coil motor (VCM) includes drive circuitry coupled to drive the VCM according to a logic state of the system. Current shaping circuitry is configured to temporarily decrease the bandwidth of a VCM transconductance loop in response to a control signal. The transconductance loop includes at least the VCM, the current shaping circuitry and the drive circuitry. The system also includes logic configured to provide the control signal at an end portion a drive logic state to enter a current shaping logic state as a transition from the drive logic state to a floating logic state to reduce current through the VCM such that acoustic emissions from the VCM are mitigated during the retract.

20 Claims, 5 Drawing Sheets

SYSTEM AND METHOD OF CURRENT SHAPING CONTROL FOR RETRACT

CROSS REFERENCE TO RELATED APPLICATION

This application claims the benefit of U.S. Provisional Application No. 61/095,396, which was filed on Sep. 9, 2008, and entitled NEW ARCHITECTURE FOR RETRACT VOICE COIL MOTOR (VCM) CURRENT SHAPING CONTROL, which is incorporated herein by reference.

TECHNICAL FIELD

This invention relates to electronic circuits, and more specifically to a system and method of current shaping control that can be used during retract.

BACKGROUND

Magnetic disk-drives, such as hard-drives, are implemented in almost all personal computers and enterprise-class server computers. Typical magnetic disk drives are operated by a spindle motor (SPM) that spins the magnetic disk and a voice coil motor (VCM) that drives and positions the magnetic disk read and/or write head. As an example, the VCM can be a linearly operated servo motor that can operate in a seek mode and in a tracking mode. The VCM can also operate in a head-retraction mode. When the part experiences a power failure or any other major device fault condition, an emergency retract can be initiated to operate the VCM to retract the magnetic disk read/write head up the ramp. The retract is performed to help prevent damage the fault condition may cause to the VCM and/or spindle motor as well as mitigate damage to the magnetic disk(s). There are several approaches that can be implemented to perform the retract. However, many are either overly expensive and/or result in undesirable acoustic emissions emanating from the disc drive during retract.

SUMMARY

One embodiment of the invention provides a system for implementing current shaping for retract of a voice coil motor (VCM). The system includes drive circuitry coupled to drive the VCM according to a logic state of the system. Current shaping circuitry is configured to temporarily decrease the bandwidth of a VCM transconductance loop in response to a control signal. The transconductance loop includes at least the VCM, the current shaping circuitry and the drive circuitry. The system also includes logic configured to provide the control signal at an end portion a drive logic state to enter a current shaping logic state as a transition from the drive logic state to a floating logic state to reduce current through the VCM such that acoustic emissions from the VCM are mitigated during the retract.

Another embodiment of the invention provides a system for reducing acoustic noise of a voice coil motor (VCM) during retract. The system includes control logic configured to control an operating state of the VCM during a substantially constant velocity retract in one of a drive state, a current shaping state and a floating state. Current shaping circuitry is configured to temporarily decrease bandwidth of a VCM transconductance loop during the current shaping state. The control logic provides the current shaping state at a transition from the drive state to the floating state such that current through the VCM decays to about zero during the current shaping state.

Another embodiment of the invention provides a method for controlling an actuator during retract of an actuator arm in which the actuator forms part of a transconductance loop. The method includes driving the actuator during a drive state. At an end portion of the drive state, a current shaping state is entered in which bandwidth of the transconductance loop is reduced temporarily. After the current shaping state, the actuator is floated during a floating state. The drive state, the current shaping state and the floating state can be repeated until the retract has completed.

DETAILED DESCRIPTION

The present invention relates to systems and methods to implement current shaping for a voice coil motor (VCM). The current shaping includes circuitry that is configured to reduce current through the VCM at an end portion of a drive state during retract. As a result of the current shaping, acoustic emissions associated with performing retract can be reduced.

Figure 1:
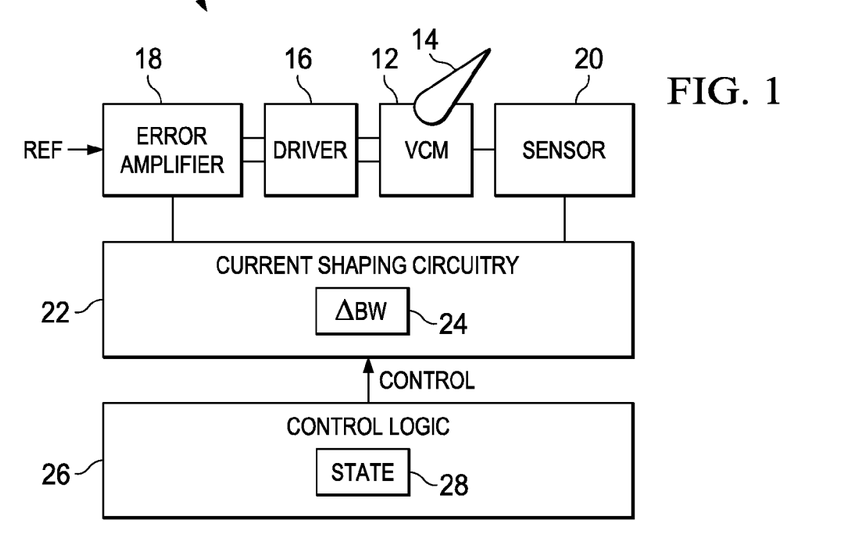
FIG. 1 illustrates an example block diagram of a VCM loop that includes a current shaping system in accordance with an aspect of the invention.

FIG. 1 depicts an example of a VCM loop 10 that is configured to control a VCM 12 during retract of one or more actuator arm 14. The VCM 12 is coupled to control movement of the actuator arm(s) 14, both during normal operation and during retract. The arm 14 includes one or more heads that can be moved across a surface of a magnetic substrate, such as a magnetic disk (not shown), for reading and writing data relative to the head. During a retract condition, the VCM loop 10 operates to move the arm 14 to a parked condition in which it no longer is positioned over the magnetic disk.

The VCM loop 10 includes driver circuitry 16 that is connected to supply current through the VCM 12 based on an error signal provided by an error amplifier 18. The error amplifier 18 provides the error signal based on a feedback signal relative to a reference signal (REF). A sensor 20 is connected to sense current through the VCM 12 and provide a sensor signal indicative of the sensed current. For instance, the sensor signal can be provided as a voltage signal having a value corresponding to the VCM current. The sensor signal is provided as feedback to the error amplifier 18 through current shaping circuitry 22. The current shaping circuitry 22 includes circuitry, demonstrated as ΔBW 24, which is configured to selectively modify the bandwidth of the VCM loop 10 in response to a control signal.

Control logic 26 can provide the control signal to vary depending on the operating state 28 of the system. As described herein, during a retract condition, the operating state 28 can include a drive state, a current shaping state and a floating state. In one embodiment, the control logic 26 operates the VCM loop 10 according to a discontinuous constant velocity retract method. The discontinuous constant velocity retract method involves a float (sample) and drive scheme in which the VCM 12 alternates between a float state and a drive state. During the float state in retract, the VCM driver 14 is tri-stated (a high-Z state) allowing sufficient time for the current through the VCM to decay to zero. At the end of the float state, the BEMF voltage is sampled and compared against a target BEMF value to generate a velocity error signal. This signal can be filtered by a proportional-integral controller PI controller or other circuitry. The resultant filtered signal defines the new voltage across the VCM during the next ensuing drive state.

During the transition from the drive state to the float state in retract, acoustic emissions are caused as a result. These emissions are caused due to the finite amount of VCM current during the drive state quickly reducing to zero as it transitions from the drive state to the float state. Large VCM current spikes also tend occur due to the L/R time constant of the VCM. To reduce acoustic emissions during retract, the control logic 26 provides the control signal during an end portion of the VCM drive state to enter the current shaping state. During this current shaping state, the bandwidth of the VCM loop is reduced temporarily to reduce acoustic noise. In the example of FIG. 1, the ΔBW circuitry 24 is activated to reduce the bandwidth of the VCM loop 10 at the transition from the drive state to the floating state. By decreasing the bandwidth of the VCM loop 10 at the end portion of the drive state, VCM current can be reduced to about zero without causing undesirable audible noise.

While ΔBW 24 is depicted as residing in the current shaping circuitry 22 between the sensor 20 and error amplifier 18, those skilled in the art will understand and appreciate other approaches that can be used to provide for a desired decrease in loop bandwidth. For example, ΔBW 24 can be implemented by circuitry configured to decrease sensor gain, decrease driver gain or a combination thereof in response to the control signal. Additionally or alternatively, circuitry can be added to cause an increase in capacitance in the error amplifier 18 and/or an increase in the sense resistance associated with the sensor 20. Such alternative approaches can be implemented within an IC implementing the VCM loop (e.g., to cause a decrease in driver and/or sensor gain) or externally (e.g., as circuitry associated with the error amplifier 18 and/or sensor 20).

Figure 2:
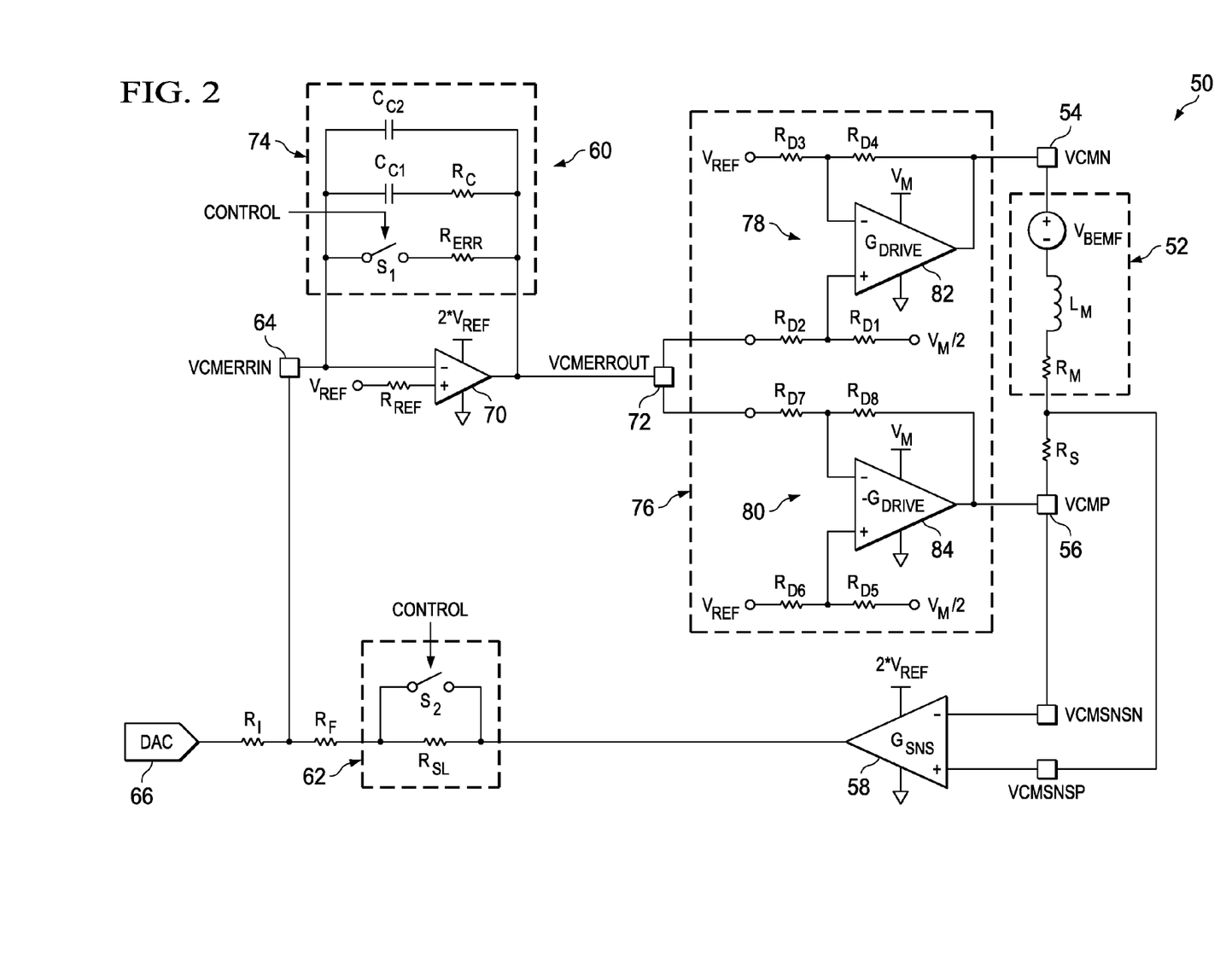
FIG. 2 depicts an example circuit diagram of a VCM loop that includes a current shaping system in accordance with an aspect of the invention.

FIG. 2 depicts an example of a circuit diagram for a VCM loop 50 that can be implemented according to an embodiment of the invention. The VCM loop 50 includes a voice coil motor 52 that is connected between drive terminals 54 and 56, demonstrated at VCMN and VCMP. In the example of FIG. 2 the VCM 52 is modeled as including a voltage source corresponding to the back electromotive force voltage ($V_{BEMF}$) connected in series with an inductor $L_M$ and a resistor $R_M$. A sense resistor $R_S$ is connected between the VCM 52 and the VCMP terminal 56. The sense resistor $R_S$ can be a small resister (e.g., less than about one Ω) for use in sensing current through the VCM, such as for maintaining substantially constant velocity during retract.

The voltage across the resistor $R_S$ is provided to inputs of a sense amplifier 58 such as can correspond to input pins VCM-SNSN and VCMSNSP. The sense amplifier 58 has a gain, demonstrated as $G_{SNS}$. The output of the sense amplifier provides feedback to an error amplifier 60. The output of the current sense amplifier 58 is provided as an error input signal through a series of connection of a feedback resistor $R_F$ and current shaping circuitry 62.

In the example of FIG. 2, the current shaping circuitry 62 can include a switch S2 connected in parallel with a resister $R_{SL}$. The resistor $R_{SL}$ thus can be selectively connected into (or isolated from) the feedback path by controlling the switch S2 based on the control signal. Thus, the control signal can be a binary signal having its value set to connect and to remove $R_{SL}$ from the feedback path by respectively opening and closing the switch S2 in response to the control signal. The switch S2 can be implemented, for example, as an arrangement of one or more transistors. The resistance $R_{SL}$ is set to a resistance to sufficiently reduce the bandwidth of the VCM loop 50 so that the reduction current at the end of a drive state is controlled in a manner to mitigate acoustic emissions by the VCM 52. As described herein, other approaches can be utilized, as an alternative or in addition to the tunable feedback provided by $R_{SL}$, to reduce the bandwidth of the VCM loop during retract.

The feedback resister $R_F$ is coupled to a VCM error input terminal 64 at which a VCM error signal is provided, demonstrated as VCMERRIN. The input terminal 64 is also coupled to receive an input from a digital-to-analog converter (DAC 66) through a corresponding input resistor $R_I$. The juncture between $R_I$ and $R_F$ thus corresponds to the input to the error amplifier 60. The input from the DAC 66 can be varied to control operation of the VCM 52, which can vary according to the operating mode of the system. In one embodiment, $R_I$ is set equal to the feedback resistor $R_F$.

In the example of FIG. 2, the error amplifier 60 compares the error signal VCMERRIN provided at the input terminal 64 relative to a reference voltage $V_{REF}$. $V_{REF}$ is provided to a non-inverting input of an operational amplifier (op amp) 70 through a reference resistor $R_{REF}$. In one example, $R_{REF}$ is equal to the parallel combination of $R_I$ and $R_F$. The op amp is coupled to an output terminal for providing an error output signal at a respective terminal or pin 72, demonstrated as VCMERROUT. The error amplifier 60 also includes feedback 74 which is connected between the output of the op amp 70 and the inverting input corresponding to the terminal 64. The feedback includes a switch S1 in series with an error resistor RERR, which can be equal to $R_I$. This switch S1 and RERR are connected in parallel with a capacitor $C_{C1}$ which is in series with resistor $R_C$. A capacitor $C_{C2}$ is also connected between the output and the inverting input in parallel with the other feedback circuitry. Control logic provides a control signal to control operation of the switch depending on the operating state of the system. For instance, during retract, the switch S1 is closed during the drive state and is open during the current shaping state which occurs in the last portion of the drive state as described herein (See, e.g., FIGS. 4 and 5).

The error output signal (VCMERROUT) provided at terminal 72 is provided to drive circuitry 76 which is coupled to drive the VCM 52. In the example of FIG. 2, the drive circuitry 76 includes a pair of drivers 78 and 80 that operate to provide complementary signals to the terminals 54 and 56 for driving the VCM 52. As depicted, the driver 78 includes a gain amplifier 82 having an output coupled to the terminal 54. A non-inverting input of the driver 82 is coupled to a juncture between resistors $R_{D1}$ and $R_{D2}$. A fixed reference voltage of $V_{M/2}$ is provided to the resistor $R_{D1}$, and the output of the error amplifier is provided to the other resistor $R_{D2}$, such that the voltage of the non-inverting input is relative to one-half of the reference $V_M$. The non-inverting input of the amplifier 82 is coupled to a node between resistors $R_{D3}$ and $R_{D4}$, which can have equal resistance. The reference voltage $V_{REF}$ is provided to $R_{D3}$ and $R_{D4}$ is coupled between the output and the inverting input of the amplifier 82. The driver 78 thus receives an input voltage that is referenced to $V_{REF}$ and amplifies the input voltage depending on the values of the resistors $R_{D1}$, $R_{D2}$, $R_{D3}$ and $R_{D4}$. The output VCMN from the driver 78 is referenced to the fixed reference voltage of $V_{M/2}$.

The other driver 80 is similarly configured. The driver includes a gain amplifier 84 having an output coupled to the terminal 56. A non-inverting input of the driver 82 is coupled to a juncture between resistors $R_{D5}$ and $R_{D6}$, which can have the same resistance values. The fixed reference voltage of $V_{M/2}$ is provided to the resistor $R_{D5}$, and the reference voltage $V_{REF}$ is provided to the other resistor $R_{D6}$. The inverting input of the amplifier 84 is coupled to a node between resistors $R_{D7}$ and $R_{D8}$. The output of the error amplifier VCMERROUT is provided to $R_{D7}$ and $R_{D8}$ is coupled between the output and the inverting input of the amplifier 84. In this way, the driver 80 takes an input voltage VCMERROUT from 72 that is referenced to $V_{REF}$ and amplifies the input voltage depending on the values of the resistors $R_{D5}$, $R_{D6}$, $R_{D7}$ and $R_{D8}$. The output VCMP from the driver 78 is referenced to the fixed reference voltage of $V_{M/2}$.

As described herein, during a retract condition, the VCM loop 50 can be operated according to a discontinuous constant velocity retract method having a drive state, a current shaping state and a float state. In the float state, the VCM driver outputs at 54 and 56 are tri-stated or set to a high impedance condition, the VCM Loop is broken with the sense amplifier 58 being disabled or Hi-Z (no current sensing) and the error amplifier 70 is enabled in an op amp mode (providing only amplification). As a result, the VCM is floating to allow the current through the VCM 52 to decay to zero. In the drive state during retract, each of the switches S1 and S2 are closed by associated control logic (see, e.g., FIG. 1) and the sense amplifier 58 is tri-stated (Hi-Z) and the error amplifier is enabled in the op amp mode for providing amplification. This results in amplification of the error signal through the control provided by the DAC 66 and driving of the VCM 52 accordingly. In the current shaping state during retract, which occurs during an end portion of the drive state, the switches S1 and S2 are open in response to the control signal, such that the resistor $R_{SL}$ is connected in the feedback loop. Thus, the VCM Loop is intact with the sense amplifier 58 being enabled and the error amplifier 70 operating normally by providing VCMERROUT representing the error between the commanded current (through DAC) and the actual current (detect by sense amplifier). For instance, in the current shaping state, the output of the DAC 66 is commanded to a mid scale corresponding to $V_{M/2}$, which can be one-half of the reference voltage $V_{REF}$. As a result of operating the switch S2 to connect $R_{SL}$ into the feedback loop, the VCM loop drives the VCM current to zero by an exponential function.

By way of further example, the bandwidth (BW) of the VCM loop 50 can be expressed as follows:

$$BW = \frac{G_{DRIVE} \cdot G_{SNS} \cdot R_S}{2 \cdot \pi \cdot (R_M + R_S) \cdot R_F \cdot C_{CI}} \qquad \text{Eq. 1}$$

where: $G_{DRIVE}$ is the gain of the drive circuitry (82, 84);
$G_{SNS}$ is the gain of the sense amplifier (58);
$R_S$ is the resistance of the sense resistor ($R_S$);
$R_M$ is the series resistance of the VCM (52);
$R_F$ is the feedback resistance in the feedback path; and
$C_{C1}$ is the capacitance of a feedback capacitor associated with the error amplifier (in the feedback 74).

During the current shaping state when $R_{SL}$ is connected into the feedback, the bandwidth decreases due to the increased resistance in the feedback path (from $R_F$ to the series resistance of $R_F + R_{SL}$) during the current shaping state. Thus, Eq. 1 during the current shaping state can be expressed as follows:

$$BW = \frac{G_{DRIVE} \cdot G_{SNS} \cdot R_S}{2 \cdot \pi \cdot (R_M + R_S) \cdot (R_F + R_{SL}) \cdot C_{CI}} \qquad \text{Eq. 2}$$

Figure 3:
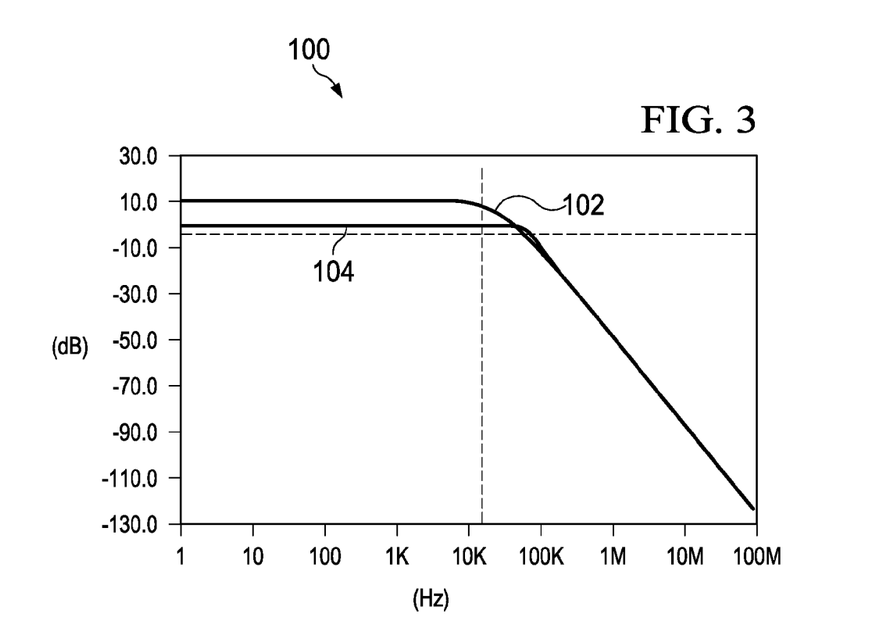
FIG. 3 is a graph depicting comparative examples of gain bandwidth for a VCM loop implemented according to an aspect of the invention.

FIG. 3 depicts a comparative example of VCM loop gain for the VCM loop 50 of FIG. 2, demonstrated as curves 102 and 104. The first curve 102 of the VCM loop gain demonstrates a loop gain having a bandwidth of about 67 KHz for an example in which the $R_{SL}$ is shorted or removed from the feedback loop, such as is the case except during the current shaping state. The other curve 104 demonstrates the loop gain for the VCM loop when the resistor $R_{SL}$ is connected by the current shaping circuitry 62. Thus, the use of the current shaping resistor $R_{SL}$ during the current shaping state results in a bandwidth of about 15 KHz. By reducing the bandwidth in this manner, current can reduce to zero at a slower rate such as to mitigate the acoustic noise from the VCM 52.

Figure 4:
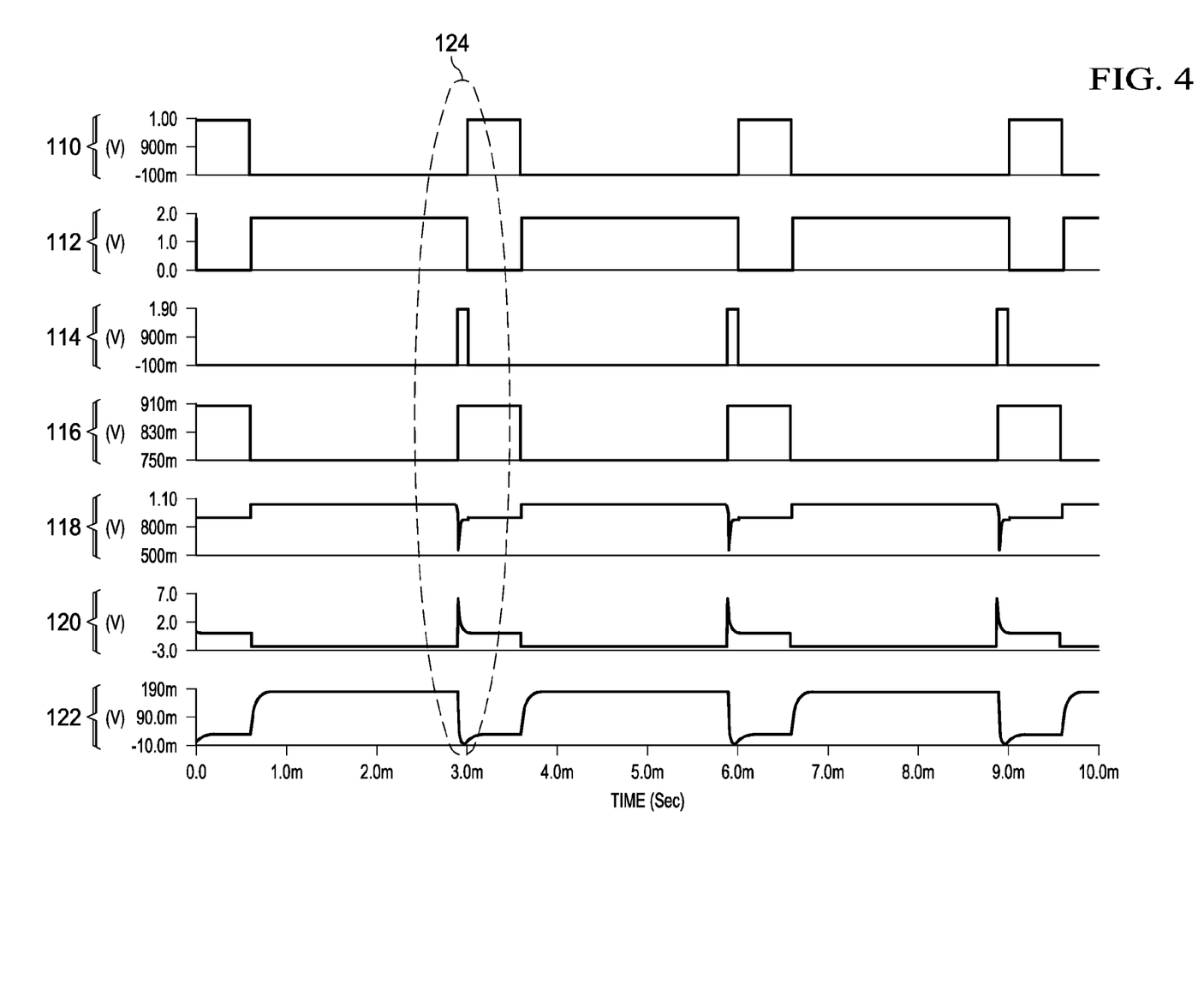
FIG. 4 is a graph of depicting examples of signals in the VCM loop of FIG. 2.
Figure 5:
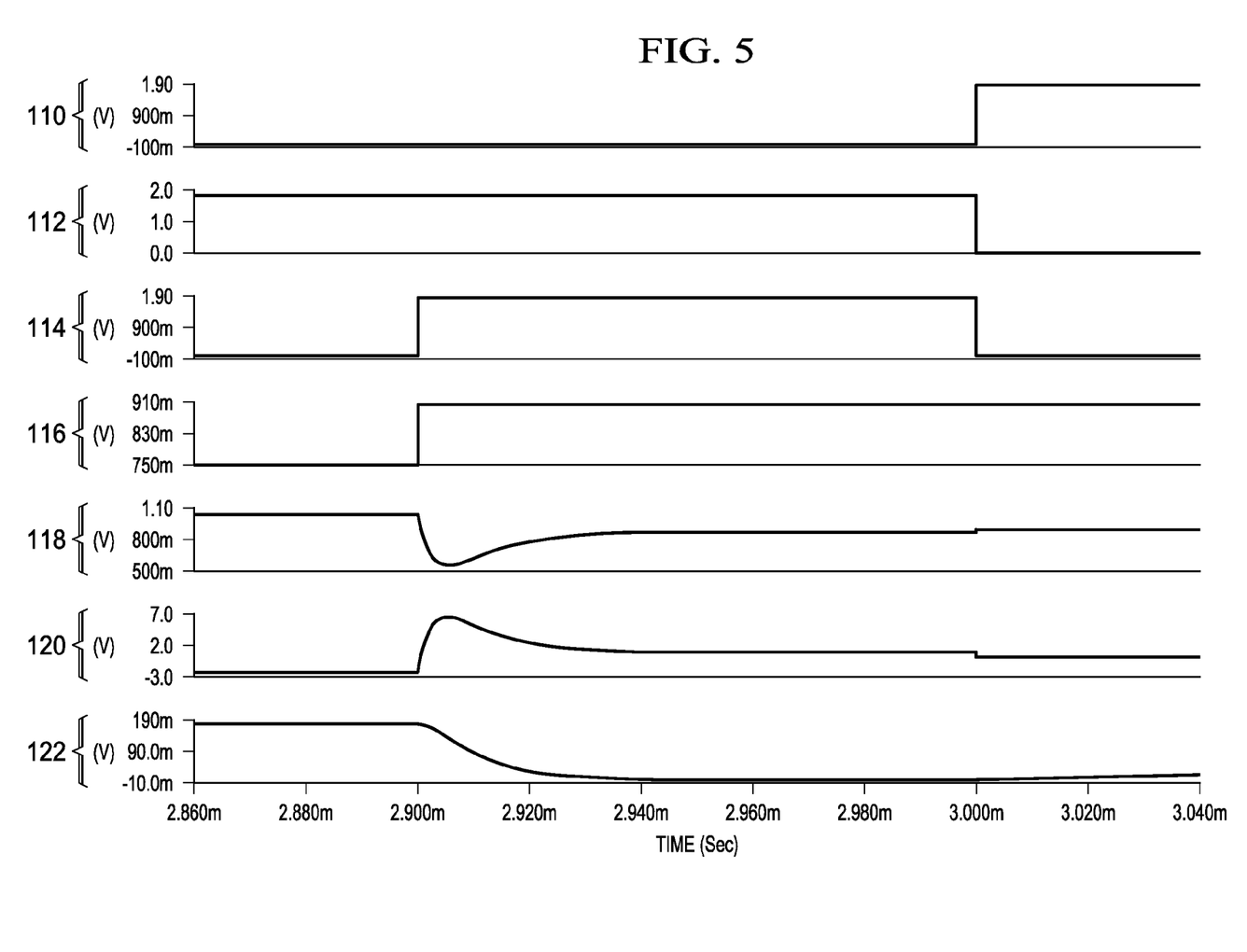
FIG. 5 is a graph depicting an enlarged portion of the signals shown in FIG. 4.

FIGS. 4 and 5 depict an example signal diagram for the float and drive scheme during a continuous velocity retract method that can be utilized to operate the example VCM loop 50 shown with respect to FIG. 2. The drive voltages at 54 and 56 are shown at 110 and 112 as a series of pulses which are 180 degrees out of phase. The current shaping signal 114 can be utilized to open the switch S2 at the end portion of the drive state. The current shaping signal thus is utilized to cause the reduction in loop bandwidth at the end of the drive pulse. The retract output voltage varies between 750 mV and about 900 mV. The 900 and 750 mV can be set at the output of the DAC 66 to occur during the current shaping state and floating state accordingly. The corresponding change in the error amplifier output, indicated at 118, occurs coincident with the change in the DAC output voltage. The VCM voltage also changes accordingly thus varying between zero volts as during the floating state and about −2.8 volts during the drive states as indicated at 120. It is also shown that the VCM current 122 decreases to about zero during the current shaping state which provides the transition to the subsequent floating state. The current 122 is depicted in volts corresponding to the voltage across the sense resistor $R_S$.

FIG. 5 depicts an enlarged view of the signals 110 through 122 from FIG. 4, indicated in FIG. 4 by a dashed oval at 124. The enlarged view of FIG. 5 thus demonstrates, an end of a drive state, a current shaping state and a floating state.

Figure 6:
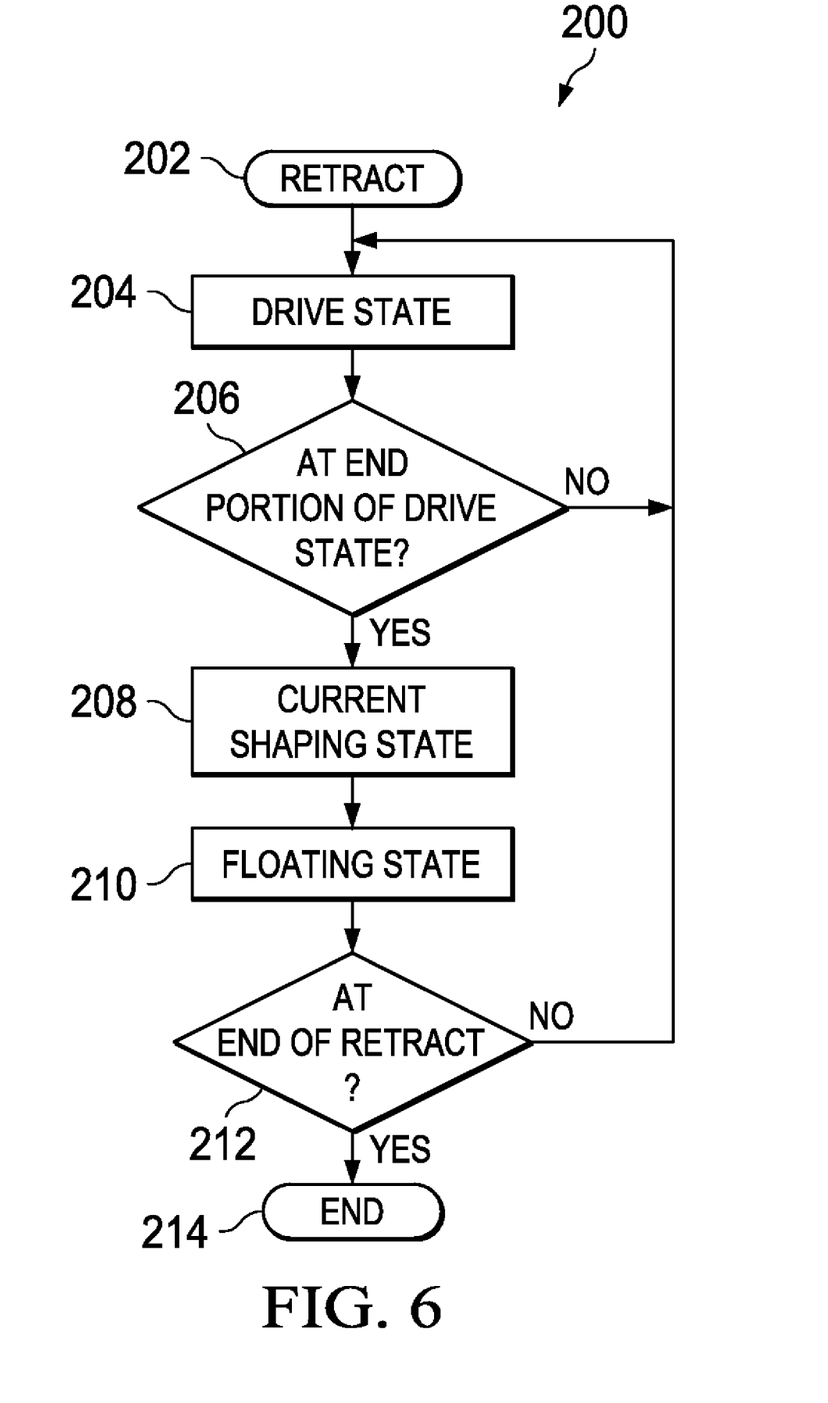
FIG. 6 illustrates an example of a method for performing current shaping during retract in accordance with an aspect of the invention.

In view of the foregoing structural and functional features described above, certain methods will be better appreciated with reference to FIG. 6. It is to be understood and appreciated that the illustrated actions, in other embodiments, may occur in different orders and/or concurrently with other actions. Moreover, not all illustrated features may be required to implement a method.

FIG. 6 illustrates an example of a method 200 for controlling an actuator, such as a VCM, during retract. The method begins at 202 in which retract is initiated. Those skilled in the art will understand and appreciate various approaches that can be employed to detect that retract may be required and to initiate retract. At 204, the actuator is driven during a drive state, such as by controlling current through the actuator. At 206, a determination is made as to whether the system is at an end portion of the drive state. The end of the drive state, for example, can correspond to a predetermined end portion of the drive state, such as based on expected timing for a given system design. If the end portion has not been reacted (NO), the method returns to 204 to continue driving current to the actuator. Once the end of the drive state has been reached at 206 (YES), the method proceeds from 206 to 208 to perform current shaping in which the bandwidth of the actuator control loop is temporarily reduced.

As described herein, the reduction in loop bandwidth can be implemented by increasing resistance of a feedback path of the loop for the remainder of the expected drive state while an input control voltage is set to mid-scale. Additionally or alternatively, other approaches can be employed to reduce the bandwidth including those mentioned above. The reduction in loop bandwidth allows the current through the actuator to decrease to zero by an exponential function.

At 210, after the current shaping (at 208), the methods proceeds to 210 in which the motor enters a floating state at 208. When the floating state is entered the bandwidth of the loop can be returned to its nominal condition, such as by removing the added resistance (e.g., by shorting across a resistor by a switch. Additionally, the driver outputs are tri-stated to its high impedance condition, thus leaving the actuator floating such that motor current can decay to zero. If the retract is not completed, corresponding to a negative determination at 212, the method returns to 204 to repeat the drive state (at 204), current shaping state (208) and floating state (210) until the actuator arm has reached is end location where it can be parked. Once retract has been completed (YES), the method ends at 214. It will be appreciated that the additional control and reduction in bandwidth at the transition from the drive state to the floating state helps to reduce acoustic noise.

What have been described above are examples of the invention. It is, of course, not possible to describe every conceivable combination of components or methodologies for purposes of describing the invention, but one of ordinary skill in the art will recognize that many further combinations and permutations of the present invention are possible. Accordingly, the invention is intended to embrace all such alterations, modifications, and variations that fall within the spirit and scope of this application including the appended claims.

What is claimed is:

1. A system for performing retract of a voice coil motor (VCM), the system comprising:
   drive circuitry coupled to drive the VCM according to an operating logic state of the system;
   current shaping circuitry that includes a switch coupled in parallel with a current shaping resistor, and wherein the current shaping circuitry, wherein the current shaping circuitry is configured to temporarily decrease bandwidth of a VCM transconductance loop in response to a control signal, and wherein the VCM transconductance loop including at least the VCM, and wherein the current shaping circuitry and the drive circuitry, and wherein the switch being operated in response to the control signal to modify the bandwidth of the VCM transconductance loop; and
   logic configured to provide the control signal at an end portion a drive logic state to enter a current shaping logic state as a transition from the drive logic state to a floating logic state to reduce current through the VCM such that acoustic emissions from the VCM are mitigated during the retract.

2. The system of claim 1, wherein the system further comprises an error amplifier configured to provide an error signal based on a feedback signal relative to a reference signal, the drive circuitry driving the VCM based on the error signal.

3. The system of claim 2, wherein the current shaping circuitry is part of a feedback path between the VCM and the error amplifier.

4. The system of claim 3, wherein the switch and a current shaping resistor are in the feedback path.

5. The system of claim 4, wherein the current shaping resistor has a resistance that decreases the bandwidth of the VCM transconductance loop to less than about 20 KHz.

6. The system of claim 4, wherein the system further comprises a sensor coupled to monitor the current through the VCM, the sensor providing a sensor signal via the feedback path to the error amplifier except during the drive logic state.

7. The system of claim 6, wherein the sensor further comprises a sense resistor in series with the VCM, the sensor including a sense amplifier that provides the sensor signal based on voltage potential across the sense resistor.

8. The system of claim 7, wherein the bandwidth (BW) of the VCM transconductance loop is defined by:

$$BW = \frac{G_{DRIVE} \cdot G_{SNS} \cdot R_S}{2 \cdot \pi \cdot (R_M + R_S) \cdot R_F \cdot C_{CI}}$$

where: $G_{DRIVE}$ is the gain of the drive circuitry;
BW the is bandwidth;
$G_{SNS}$ is the gain of the sense amplifier;
$R_S$ is a resistance of the sense resistor;
$R_M$ is a series resistance of the VCM;
$R_F$ is a resistance of the feedback path, and $R_F = R_F + R_{SL}$ during the current shaping logic state, where $R_{SL}$ is the resistance of the current shaping resistor; and
$C_{CI}$ is a feedback capacitance connected between an input and the output of the error amplifier.

9. The system of claim 3, wherein the system further comprises a digital-to-analog converter (DAC) that provides a control voltage to a control node of the feedback path, the control voltage depending on the operating logic state of the system.

10. The system of claim 1, wherein the retract is a discontinuous constant velocity retract.

11. A system for reducing acoustic noise of a VCM during retract, the system comprising:
    control logic configured to control an operating state of the VCM during a substantially constant velocity retract in one of a drive state, a current shaping state and a floating state; and
    current shaping circuitry that includes a switch connected in parallel with a current shaping resistor, wherein the current shaping circuitry is configured to temporarily decrease bandwidth of a VCM transconductance loop during the current shaping state, and wherein the control logic providing the current shaping state at a transition from the drive state to the floating state such that current through the VCM decays to about zero during the current shaping state, and wherein the switch being operated in during the current shaping state to modify the bandwidth of the VCM transconductance loop.

12. The system of claim 11, wherein the system further comprises:
    drive circuitry coupled to drive the VCM based on an error signal; and
    an error amplifier configured to provide the error signal based on a feedback signal relative to a reference signal, the drive circuitry, the error amplifier, the VCM and the current shaping circuitry defining at least a portion of the VCM transconductance loop.

13. The system of claim 12, wherein the current shaping circuitry is part of a feedback path between the VCM and the error amplifier.

14. The system of claim 13, wherein the current shaping resistor has a resistance that decreases the bandwidth of the VCM transconductance loop to less than about 20 KHz.

15. The system of claim 13, wherein the system further comprises a sensor coupled to monitor current through the VCM, the sensor providing a sensor signal via the feedback path to the error amplifier except during the drive state.

16. The system of claim 15, wherein the system further comprises a DAC that provides an output voltage to a control node of the feedback path depending on the operating state of the system, the error signal varying according to the output voltage provided by the DAC.

17. The system of claim 16, wherein the bandwidth of the VCM transconductance loop is defined by:

$$BW = \frac{G_{DRIVE} \cdot G_{SNS} \cdot R_S}{2 \cdot \pi \cdot (R_M + R_S) \cdot R_F \cdot C_{C1}}$$

where: $G_{DRIVE}$ is the gain of the drive circuitry;
BW is the bandwidth;
$G_{SNS}$ is the gain of a sense amplifier of the sensor;
$R_S$ is the resistance of a sense resistor of the sensor;
$R_M$ is a series resistance of the VCM;
$R_F$ is the feedback resistance, $R_F=R_F+FR_{SL}$ during the current shaping state; and
$C_{C1}$ is a feedback capacitance connected between an input and the output of the error amplifier.

18. An apparatus comprising:
a VCM;
a sensor that is coupled to the VCM;
a controller having:
    a sense amplifier that is coupled to the sensor;
    an error amplifier;
    a drive circuit that is coupled to the error amplifier and the VCM;
    a plurality of resistors coupled in series with one another between sense amplifier and the error amplifier;
    a switch that is coupled in parallel with at least one of the plurality of resistors; and
    logic that is configured to actuate the switch to adjust acoustic emissions from the VCM.

19. The apparatus of claim 18, wherein the error amplifier further comprises:
    an operational amplifier having an input that is coupled to at least one of the resistors and an output that is coupled to the drive circuit; and
    a switched resistor-capacitor (RC) network that is coupled to the input and output of the operational amplifier that is controlled by the logic.

20. The apparatus of claim 19, wherein the switch further comprises a first switch, and wherein the switched RC network further comprises:
    a first feedback capacitor that is coupled between the input and output of the operational amplifier;
    a second feedback capacitor that is coupled to the input of the operational amplifier;
    a first feedback resistor that is coupled between the second feedback capacitor and the output of the amplifier;
    a second switch that is coupled to the input of the operational amplifier and that is controlled by the logic; and
    a second feedback resistor that is coupled between the second switch and the output of the operational amplifier.

* * * * *